(12) United States Patent
Mitadera et al.

(10) Patent No.: US 7,265,187 B2
(45) Date of Patent: Sep. 4, 2007

(54) PROCESS FOR PRODUCTION OF POLYAMIDE COMPOSITE MATERIAL

(75) Inventors: Jun Mitadera, Kanagawa (JP);
Kazunobu Maruo, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 476 days.

(21) Appl. No.: 10/675,951

(22) Filed: Oct. 2, 2003

(65) Prior Publication Data

US 2004/0068037 A1    Apr. 8, 2004

(30) Foreign Application Priority Data

Oct. 3, 2002    (JP) .............................. 2002-291427

(51) Int. Cl.
*C08J 3/20*    (2006.01)
*C08J 3/22*    (2006.01)
(52) U.S. Cl. ...................... 525/432; 525/443; 524/442; 524/445; 415/145
(58) Field of Classification Search ................ 525/432, 525/443; 524/442, 445, 449; 425/145
See application file for complete search history.

(56) References Cited

U.S. PATENT DOCUMENTS 4,857,600 A * 8/1989 Gross et al. ................. 525/285

2001/0056148 A1 * 12/2001 Sato et al. ................... 524/442

FOREIGN PATENT DOCUMENTS

| EP | 1 156 073 | 11/2001 |
| WO | WO 01/04197 | 1/2001 |
| WO | WO 02/066553 | 8/2002 |

OTHER PUBLICATIONS

European Search Report mailed Dec. 2, 2003 for EP No. 03 02 1786.

* cited by examiner

*Primary Examiner*—Irina S. Zemel
(74) *Attorney, Agent, or Firm*—Antonelli, Terry, Stout & Kraus, LLP.

(57) ABSTRACT

In the process of the present invention, a polyamide A1 and an organized clay B are mixed mainly by dispersive mixing, and after added with a polyamide A2, mixed mainly by distributive mixing in a corotating intermeshing twin-screw extruder so designed as to effect the dispersive mixing and the distributive mixing. The organized clay B is completely and finely dispersed and distributed throughout the resultant polyamide composite material. Shaped articles such as films and sheets made of the polyamide composite material exhibit excellent gas barrier properties and transparency with little malodor mainly attributable to the decomposed products of the organizing agent for preparing the organized clay B.

13 Claims, 4 Drawing Sheets

Reverse Full-Flight

Group of Elements: High Distributive Mixing

Group of Elements: High Dispersive Mixing

ZME Mixing Element

Reduction of Diameter
= Increase of Clearance

TME Mixing Element

Screw Mixing Element (SME)

PROCESS FOR PRODUCTION OF POLYAMIDE COMPOSITE MATERIAL

BACKGROUND OF THE INVENTION

1. Field of the Invention

The present invention relates to a polyamide composite material containing an organized clay, and a production method thereof, and more particularly to a polyamide composite material comprising a specific organized clay and polyamide, which is excellent in gas barrier properties and transparency, and a production method of the polyamide composite material.

2. Description of the Prior Art

Polyamides have been widely used not only as injection-molding materials for automotive, electric and electronic parts, but also as packaging materials for foodstuffs, beverages, drugs and electronic parts, because of their excellent mechanical properties and processability as well as relatively high gas barrier properties. Among the polyamides, poly(m-xylylene adipamide) produced by the polycondensation of a diamine component mainly composed of m-xylylenediamine and a dicarboxylic acid component mainly composed of adipic acid (hereinafter occasionally referred to merely as "nylon MXD6") exhibits a low permeability against gaseous substances such as oxygen and carbon dioxide as compared to other polyamides, and therefore, has now come into use as packaging materials requiring gas barrier properties such as films and bottles. In recent years, there is a strong demand for packaging materials capable of keeping freshness of foodstuffs, beverages, etc., for a prolonged period of time. Therefore, the nylon MXD6 has been required to have further enhanced gas barrier properties.

One of the methods for enhancing the gas barrier properties of polyamides is to uniformly disperse phyllosilicate in a polyamide thereby to prepare a polyamide composite material (for example, Japanese Patent Application Laid-Open No. 62-74957). Japanese Patent Application Laid-Open No. 9-217012 discloses a method of producing a polyamide composite material comprising a polyamide having phyllosilicate uniformly dispersed therein by melt-kneading the polyamide and the phyllosilicate in a twin-screw extruder. The proposed methods requires to apply a strong shear force to a mixture of the nylon MXD6 and the organized clay by the rotation of a screw in the melt-kneading process. The heat generated by the shearing decomposes the organizing agent in the organized clay to allow the agglomeration of the clay. Therefore, the clay fails to be completely and finely dispersed and/or distributed in the polyamide to result in the failure in improving the gas barrier properties. In addition, there occur problems such as deterioration in transparency, increase in YI and malodor development due to decomposition of the organizing agent.

SUMMARY OF THE INVENTION

An object of the present invention is to solve the above problems and provide a polyamide composite material containing clay well dispersed and distributed therein, which is excellent in the gas barrier properties and transparency, and less malodorous.

As the result of extensive studies in view of solving the above problems, the present inventors have found that a polyamide composite material that is produced by melt-kneading a specific polyamide with a specific organized clay under specific conditions is not only excellent in the gas barrier properties and transparency, but also free from malodor, this having been not attained in the conventional technique. The present invention has been accomplished on the basis of this finding.

Thus, the present invention provides a process for producing a polyamide composite material comprising a polyamide A1, a polyamide A2, each being produced by polycondensing a diamine component containing 70 mol % or higher of m-xylylenediamine with a dicarboxylic acid component containing 50 mol % or higher of a $C_4$ to $C_{20}$ α,ω-linear aliphatic dicarboxylic acid, and an organized clay B, by using a corotating intermeshing twin-screw extruder in which at least a feed section (a) with a feed port (a), a kneading section (a) having a high dispersive mixing capability, a feed section (b) with a feed port (b) and a kneading section (b) having a high distributive mixing capability are arranged in this order, the process comprising:

a step of feeding the polyamide A1 containing a phosphorus compound in an amount of 500 ppm or smaller in terms of phosphorus atom and having a relative viscosity of 1.1 to 4.7 and the organized clay B into the feed section (a) through the feed port (a);

a step of melt-kneading the polyamide A1 and the organized clay B substantially by dispersive mixing in the kneading section (a) to obtain a melt-knead product;

a step of transporting the melt-knead product from the kneading section (a) to the feed section (b), simultaneously feeding the polyamide A2 having a relative viscosity of 2.0 to 4.7 into the feed section (b) through the feed port (b); and a step of melt-kneading the melt-knead product and the polyamide A2 each from the feed section (b) substantially by distributive mixing in the kneading section (b) to prepare the polyamide composite material.

The present invention also provides a polyamide composite material produced by the above production method, and a packaging material and a packaging container made of the polyamide composite material.

DETAILED DESCRIPTION OF THE INVENTION

Figure 1:
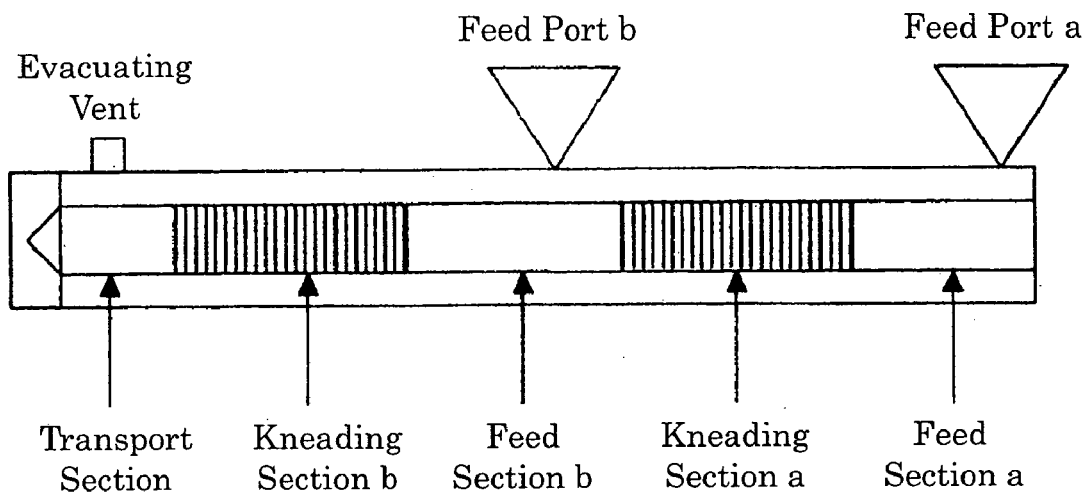
FIG. 1 is a schematic view showing an example of a construction of a corotating intermeshing twin-screw extruder.

The present invention will be described in detail below.

The polyamides A1 and A2 used in the present invention are produced by polycondensing a diamine component mainly composed of m-xylylenediamine and a dicarboxylic acid component mainly composed of a $C_4$ to $C_{20}$ α,ω-linear aliphatic dicarboxylic acid.

The diamine component used in the present invention contains m-xylylenediamine in an amount of 70 mol % or higher, preferably 75 mol % or higher and more preferably 80 mol % or higher. If less than 70 mol %, the polyamides A1 and A2 are deteriorated in their gas barrier properties. Examples of the other diamines for the diamine component include, but are not limited to, aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-tirmethylhexamethylenediamine and 2,4,4-tirmethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl)ether, p-phenylenediamine, p-xylylenediamine and bis(aminomethyl)naphthalene.

The dicarboxylic acid component used in the present invention contains a $C_4$ to $C_{20}$ α,ω-linear aliphatic dicarboxylic acid in an amount of 50 mol % or higher, preferably 60 mol % or higher and more preferably 70 mol % or higher. If less than 50 mol %, the polyamides A1 and A2 are deteriorated in crystallinity, resulting in poor gas barrier properties. Examples of the $C_4$ to $C_{20}$ α,ω-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecandioic acid, with adipic acid being preferred. Examples of the other dicarboxylic acids usable for the dicarboxylic acid component include aromatic dicarboxylic acids such as terephthalic acid, isophthalic acid and 2,6-naphthalenedicarboxylic acid. In addition, a small amount of a molecular weight modifier such as monoamines and monocarboxylic acids may be added in the polycondensation for producing the polyamides A1 and A2.

The polyamides A1 and A2 may be produced by a melt polycondensation method. For example, the polyamides A1 and A2 may be produced by heating a nylon salt of m-xylylenediamine and adipic acid under pressure in the presence of water, and polymerizing the nylon salt in molten state while removing the water added and the water eliminated by the polycondensation. Alternatively, the polyamides A1 and A2 may be produced by directly adding m-xylylenediamine to molten adipic acid to allow the polycondensation to proceed under atmospheric pressure. In this method, m-xylylenediamine is continuously added to the molten adipic acid to keep the reaction system in a uniform liquid state while proceeding the polycondensation by heating the reaction system to prevent the reaction temperature from lowering under the melting points of the oligoamides and polyamides being produced.

The polyamides A1 and A2 produced by the melt-polymerization may be further polycondensed by a solid-phase polymerization method. The method for producing the polyamides A1 and A2 is not limited to particular ones, and the polyamides A1 and A2 may be produced by any suitable known methods under known polymerization conditions.

The relative viscosity of the polyamide A1 is preferably 1.1 to 4.7, more preferably 1.5 to 4.4 and still more preferably 1.7 to 4.2. If less than 1.1, the organized clay B becomes difficult to be subject to a shear force during the melt-kneading of the polyamide A1 with the organized clay B because of the excessively low melt viscosity, thereby failing to attain a uniform dispersion and/or distribution of the organic clay B. If more than 4.7, an excessive torque tends to be applied to the extruder thereby to make the production of the polyamide composite material difficult.

The relative viscosity referred to herein may be measured by a Canon Fenske viscometer, etc. on a solution prepared by dissolving 1 g of polyamide A1 or A2 in 100 ml of a 96% sulfuric acid at 25° C. The polyamide A1 used in the present invention has a number-average molecular weight of about 2,000 to 50,000.

The relative viscosity of the polyamide A2 is preferably 2.0 to 4.7, more preferably 2.05 to 4.4 and still more preferably 2.1 to 4.2. If less than 2.0, the viscosity of the resultant polyamide composite material becomes too low. If more than 4.7, an excessive torque tends to be applied to an extruder thereby to make the production of the polyamide composite material difficult. The polyamide A2 has a number-average molecular weight of about 14,000 to 50,000.

The polyamides A1 and A2 may contain a phosphorus compound to enhance a processing stability during the melt molding and prevent the discoloration of the polyamides A1 and A2. An alkali metal- or alkaline earth metal-containing phosphorus compound is preferably used as the phosphorus compound. Examples thereof include phosphates, hypophosphites and phosphites of alkali metal or alkaline earth metal such as sodium, magnesium and calcium, with the alkali metal or alkaline earth metal hypophosphite being preferred because of its extremely excellent effect of preventing the discoloration of the polyamides A1 and A2. The concentration of the phosphorus compound in the polyamides A1 and A2 is preferably 1 to 500 ppm, more preferably 350 ppm or lower and still more preferably 200 ppm or lower in terms of phosphorus atom. If exceeding 500 ppm, no additional effect of preventing the discoloration is obtained, instead, the haze of films produced from the polyamide composite material is increased.

The polyamide A1 is subject to a strong shear stress in the kneading section (a). Therefore, if the phosphorus compound is not added, the polyamide A1 tends to be thermally degraded to increase YI, thereby reducing the commercial value of the polyamide composite material.

The organized clay B used in the present invention is prepared by subjecting clay to a swelling treatment with an organizing agent. Examples of the clays for preparing the organized clay B include mica, vermiculite and smectite, and preferably a dioctahedral phyllosilicate such as montmorillonite, beidellite and nontronite and a trioctahedral phyllosilicate such as hectorite and saponite, each having a charge density of 0.25 to 0.6. Of these clays, particularly preferred is montmorillonite because of its high swelling property that allows the swelling of montmorillonite by the penetration of the organizing agent to easily expand the interlaminar space, thereby making montmorillonite easily dispersible and distributable in the polyamide composite material.

As the organizing agent, preferred are quaternary ammonium salts, and more preferred are quaternary ammonium salts having at least one alkyl group with 12 or more carbon atoms. Examples of the organizing agents include trimethylalkylammonium salts such as trimethyldodecylammonium salt, trimethyltetradecylammonium salt, trimethylhexadecylammonium salt, trimethyloctadecylammonium salt and trimethyleicosylammonium salt; trimethylalkenylammonium salts such as trimethyloctadecenylammonium salt and trimethyloctadecadienylammonium salt; triethylalkylammonium salts such as triethyldodecylammonium salt, triethyltetradecylammonium salt, triethylhexadecylammonium salt and triethyloctadecylammonium salt; tributylalkylammonium salts such as tributyldodecylammonium salt, tributyltetradecylammonium salt, tributylhexadecylammonium salt and tributyloctadecylammonium salt; dimethyldialkylammonium salts such as dimethyldidodecylammonium salt, dimethylditetradecylammonium salt, dimethyldihexadecylammonium salt, dimethyldioctadecylammonium salt and dimethylditallowammonium salt; dimethyldialkenylammonium salts such as dimethyldioctadecenylammonium salt and imethyldioctadecadienylammonium salt; diethyldialkylammonium salts such as diethyldidodecylammonium salt, diethylditetradecylammonium salt, diethyldihexadecylammonium salt and diethyldioctadecylammonium salt; dibutyldialkylammonium salts such as dibutyldidodecylammonium salt, dibutylditetradecylammonium salt, dibutyldihexadecylammonium salt and dibutyldioctadecylammonium salt; methylbenzyldialkylammonium salts such as methylbenzyldihexadecylammonium salt; dibenzyldialkylammonium salts such as dibenzyldihexadecylammonium salt; trialkylmethylammonium salts such as tridodecylmethylammonium salt, tritetradecylmethylammonium salt ant trioctadecylmethylammonium salt; trialkylethylammonium salts such as tridodecylethylammonium salt; trialkylbutylammonium salts such as tridodecylbutylammonium salt; methyldihydroxyethyl hydrogenated tallowammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. Of these organizing agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts and dimethylditallowammonium salts. These organizing agents may be used singly or in combination of two or more. In addition, quaternary ammonium salts having a glycol group such as polyethylene glycol and propylene glycol may be used as the organizing agent.

The content of the organizing agent is preferably 10 to 60% by weight of the organized clay B. If less than 10% by weight, the clay becomes difficult to be dispersed and/or distributed. If more than 60% by weight, the organizing agent tends to be degraded or decomposed by heat to cause the clay to agglomerate, thereby failing to attain a complete fine dispersion and/or distribution of the clay, and developing malodor attributable to decomposed products of the organizing agent such as amines and ammonia.

The initiation temperature of mass change as defined in JIS K-7120 of the organized clay B is preferably 210° C. or higher, more preferably 220° C. or higher and still more preferably 230° C. or higher when measured by thermogravimetry under nitrogen flow. If lower than 210° C., the organizing agent tends to be degraded or decomposed by heat in the melt-kneading to cause the clay to agglomerate, thereby failing to attain a complete and fine dispersion and/or distribution of the clay and developing malodor attributable to decomposed products of the organizing agent such as amines and ammonia.

In the present invention, the uniform dispersion and distribution of the organized clay B may be confirmed by a method of observing the clay in a sample under a transmission electron microscope, a method of observing the surface of sample under a scanning electron microscope, a method of measuring the interlaminar distance of the clay by an X-ray diffraction method, etc. The methods using the electron microscopes enables direct measurement of the interlaminar distance of the clay. In the X-ray diffraction method, when no peak attributable to the clay is observed in the diffraction profile, the dispersion and distribution of the clay is considered good.

The polyamide composite material of the present invention is produced by melt-kneading the polyamide A1, the polyamide A2 and the organized clay B in a corotating intermeshing twin-screw extruder.

The corotating intermeshing twin-screw extruder usable in the present invention is designed such that at least a feed section (a) with a feed port (a), a kneading section (a) having a high dispersive mixing capability, a feed section (b) with a feed port (b), and a kneading section (b) having a high distributive mixing capability are arranged in this order, and may further include a transport section for transporting the feedstocks and the melt-knead products towards the downstream end of the extruder (FIG. 1).

In general, the corotating intermeshing twin-screw extruder is a self-cleaning extruder in which two screws are rotated in the same directions at an intermesh ratio of 1.2 to 1.7. The intermesh ratio is calculated by dividing an outer screw diameter by a short screw diameter. The extruder may be provided with a vent opened to atmosphere for discharging air contained in the feedstocks to improve the feeding ability. The kneading sections may not necessarily be self-cleaning. The screw may be a single flight screw, a double flight screw or a triple flight screw, with the double flight screw being most common.

The corotating intermeshing twin-screw extruder is most effective to produce the polyamide composite material because a shear stress sufficient for dispersing and distributing the clay is obtained, but a single-screw extruder will be undesirable because a shear stress sufficient for dispersing and distributing the clay is not obtained. Although the polyamide composite material may be also produced using a counterrotating twin-screw extruder, a non-intermeshing twin-screw extruder, etc., these extruders are less effective for general-purpose use and may fail to produce a shear force sufficient for uniformly dispersing and distributing the clay.

In the process of the present invention, the polyamide A1 and the organized clay B are fed through the feed port (a) and melt-kneaded in the kneading section (a) having a high dispersive mixing capability. Then, at any suitable timing subsequent to the above melt-kneading, the polyamide A2 is fed through the feed port (b) provided at the mid portion of a cylinder of the twin-screw extruder, and melt-kneaded with the melt-knead product from the kneading section (a) in the kneading section (b) having a high distributive mixing capability to produce the polyamide composite material of the present invention. If a whole amount of the polyamide A1, the polyamide A2 and the organized clay B are fed through the feed port (a), the polyamides A1 and A2 come to be excessively hot by a shear force applied thereto to lower the viscosity, resulting in poor dispersion and/or distribution of the organized clay B. In addition, since the polyamides A1 and A2 are degraded or damaged by the heat generated during the kneading, YI is increased, the amount of gels or fish eyes is increased and the draw-down is likely to occur in the process for forming films and sheets because of the lowered molecular weight and melt viscosity, thereby reducing the commercial values of the resultant composite material and its shaped articles. If the dispersive mixing capability of the kneading section (a) is low, the organized clay is not sufficiently crushed nor finely dispersed owing to an insufficient shear stress applied thereto. If the distributive mixing capability of the kneading section (b) is low, the melt-knead product of the polyamide A1 and the organized clay B tends to be insufficiently mixed with the polyamide A2 supplied through the feed port (b).

The feed port is a part through which resins, etc., are supplied into the extruder. A belt feeder, a screw feeder, a vibration feeder, etc. may be used to feed the polyamides A1 and A2 and the organized clay B, although not limited thereto. The polyamide A1 and the organized clay B may be separately fed by respective feeders, or may be fed after being dry-blended.

The feed section has a function for transporting the feedstocks fed through the feed ports to the next kneading section, and is provided with a screw therefor.

The polyamide A2 may be supplied through the feed port (b) by a side-feeding method using extruder, etc., although not limited thereto. To improve and stabilize the side-feeding performance, the extruder may be provided with a vent opened to atmosphere.

The kneading section is a portion in which the feedstocks are subjected to shearing, distribution, diffusion, extensive flow, etc., by the screws or barrels to uniformly disperse or distribute the organized clay B in the polyamide A1 or A2 or the polyamides A1 and A2. The "kneading" used herein means to subject the feedstocks to shearing, distribution, diffusion, extensive flow, etc., by the screws or barrels to uniformly disperse or distribute the organized clay B in the polyamide A1 or A2 or the polyamides A1 and A2.

Figure 2:
FIG. 2 is a schematic view showing an example of a construction of a screw for a corotating intermeshing twin-screw extruder.
Figure 2:
Figure 2:
Figure 2:

As illustrated in FIG. 2, the screws of the twin-screw extruder used in the present invention preferably comprise portions corresponding to the respective sections of the extruder. Specifically, to finely disperse or distribute the organic clay B in the polyamide, the screw preferably comprises a feed screw portion for transporting the feedstocks (polyamide A1 and organized clay B) from the feed port (a) towards the downstream end of the extruder (corresponding to the feed section (a)); a portion having a group of elements with a high dispersive mixing capability for melt-kneading the feedstocks from the feed section (a) (corresponding to the kneading section (a)); a feed screw portion for transporting the kneaded feedstocks from the kneading section (a) together with the polyamide A2 fed through the feed port (b) (corresponding to the feed section (b)); a portion having a group of elements with a high distributive mixing capability for melt-kneading the kneaded feedstocks from the kneading section (a) and the polyamide A2 fed through the feed port (b) (corresponding to the kneading section (b)); and a feed screw portion for transporting the kneaded feedstocks from the kneading section (b) towards the downstream end of the extruder (corresponding to the transport section). An extruder that is not provided with the kneading section (a) and/or (b) fails to exert the actions of shearing, distribution, diffusion, etc. on the feedstocks sufficient for uniformly and finely dispersing or distributing the organic clay B throughout the polyamides A1 and A2.

Figure 3:
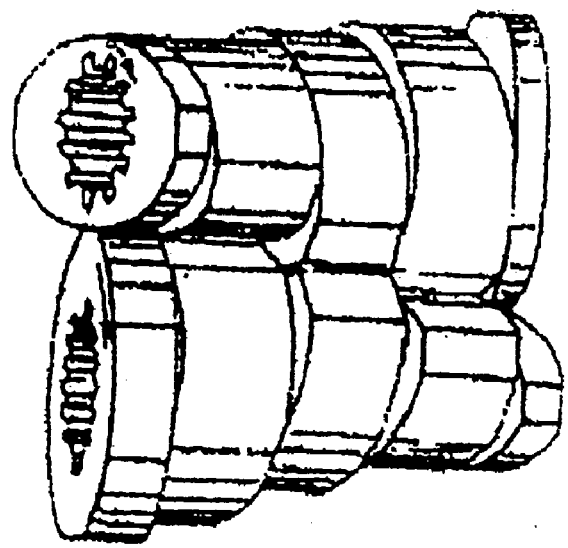
FIG. 3 is a schematic view showing an example of an element having a high dispersive mixing capability (kneading disk)
Figure 4:
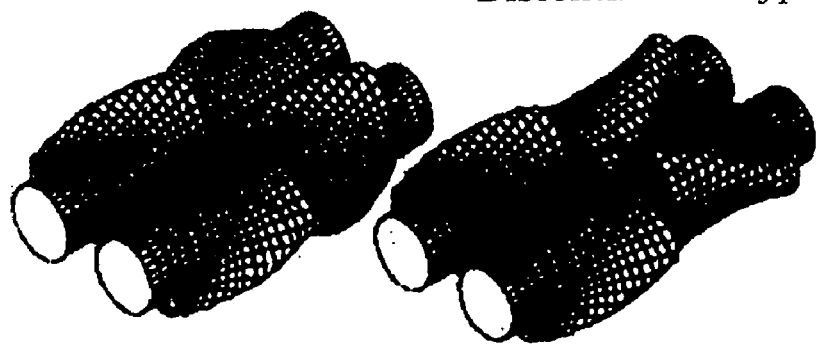
FIG. 4 is a schematic view showing another example of an element having a high dispersive mixing capability (rotor)
Figure 5:
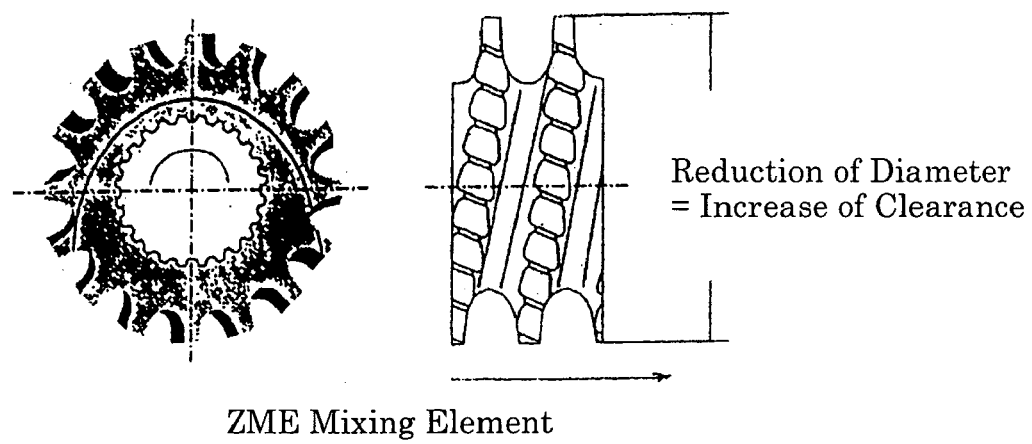
FIG. 5 is a schematic view showing an example of an element having a high distributive mixing capability (ZME mixing element)
Figure 6:
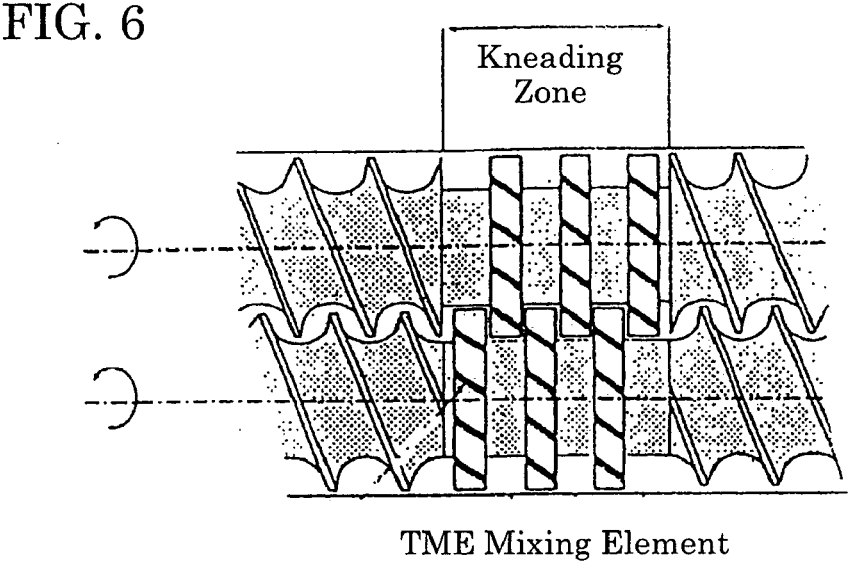
FIG. 6 is a schematic view showing another example of an element having a high distributive mixing capability (TME mixing element)
Figure 7:
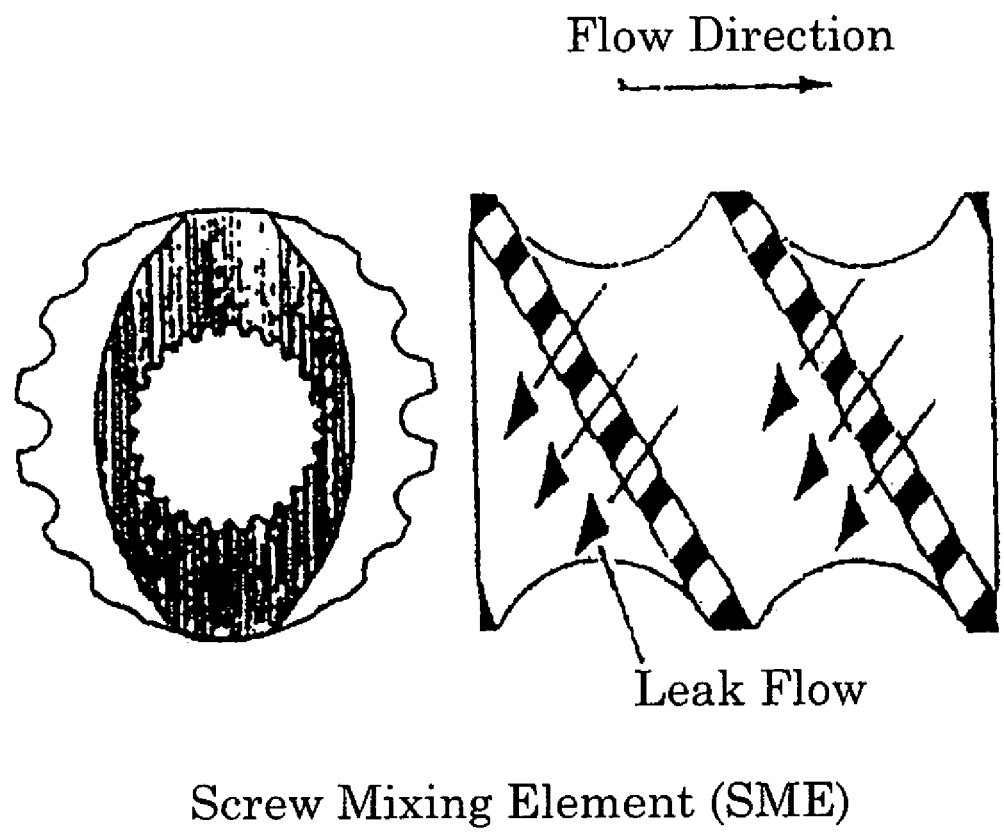
FIG. 7 is a schematic view showing still another example of an element having a high distributive mixing capability (screw mixing element).

The mixing action of materials is generally classified into dispersive mixing and distributive mixing. The dispersive mixing is a mixing action accompanied by the reduction in particle size, namely, the crush of particles. The distributive mixing is a mixing action by the position exchange of a particle with another. Similarly, in the present invention, the mixing with high dispersive mixing capability means a mixing substantially governed by the crush of the polyamide A1 and the particles of the organized clay B, and the mixing with high distributive mixing capability means a mixing substantially governed by the position exchange of the polyamides A1 and A2 with particles of the organized clay B. It should not be construed that the dispersive mixing is not accompanied by the distributive mixing, and vice versa. Examples of the elements having a high dispersive mixing capability include, as shown in FIGS. 3 and 4, a rotor and a kneading disk which has a broad disk width, for example, has a W/D ratio of 0.15 to 1.5, wherein W is a disk width and D is a screw diameter, although not limited thereto. Examples of the elements having a high distributive mixing capability include, as shown in FIGS. 5 to 7, a rotor, a notched full-flight disk, a mixing gear and a kneading disk which has a narrow disk width, for example, has a W/D ratio of 0.02 to less than 0.15, although not limited thereto. The notched full-flight disk may be reversely flighted. The mixing gear may or may not be self-cleaning. The helix angle of the kneading disk is not particularly restricted, and kneading disks having different helix angles may be combinedly used. The maximum shear stress produced by the rotor is smaller than that of the kneading disk, but the rotor applies a uniform shear stress to the feedstocks. Therefore, the rotor is considered to have both the dispersive mixing capability and the distributive mixing capability. These elements may be appropriately combined with each other to constitute screws corresponding to the kneading sections (a) and (b).

The portion of the screw corresponding to the kneading section (a) is preferably a high dispersive-mixing screw comprising at least one element, such as a reverse full-flight disk and a sealing disk, having a pressure-dropping function to allow the kneading section (a) to be sufficiently filled with the feedstocks, and at least one element selected from a kneading disk having a broad disk width and a rotor. If the portion of the screw corresponding to the kneading section (a) is highly distributive-mixing, the shear force applied to the feedstocks is insufficient to result in a poor dispersion of the organized clay B. If the elements such as a reverse full-flight disk and a sealing disk are not used in the kneading section (a), the feedstocks fail to sufficiently fill the kneading section (a) and a sufficient shearing residence time is not attained, resulting in a poor dispersion of the organized clay B.

The portion of the screw corresponding to the kneading section (a) preferably comprises, at least partly, a kneading disk having a ratio W/D of preferably 0.15 to 1.5, more preferably 0.2 or higher and still more preferably 0.3 or higher, wherein W is the width of the kneading disk and D is the screw diameter of the twin-screw extruder. If less than 0.15, the distributive mixing capability is too strong. When the ratio W/D is 0.15 or higher, the dispersive mixing capability becomes strong, resulting in a good dispersion of the organized clay B.

The portion of the screw corresponding to the kneading section (b) is preferably a high distributive-mixing screw comprising at least one element, such as a reverse full-flight disk and a sealing disk, having a pressure-dropping function to allow the kneading section (b) to be sufficiently filled with the feedstocks, and at least one element selected from a kneading disk having a narrow disk width, a rotor, a notched flight disk and a mixing gear. If the portion of the screw corresponding to the kneading section (b) is highly dispersive-mixing, an excessive shearing force is applied to the polyamides A1 and A2 to cause an excessive heat generation of the polyamide A1 and A2, thereby degrading and damaging the polyamides A1 and A2 to increase YI, increase the amount of gels and fish eyes and cause the drawdown in the process for forming films and sheets because of the lowered molecular weight and melt viscosity, this reducing the commercial values of the resultant composite material and its shaped articles. If the elements such as a reverse full-flight disk and a sealing disk are not used in the kneading section (b), the filling thereof with the feedstocks is lowered and a sufficient shearing residence time is not attained, resulting in a poor distribution of the organized clay B.

The length of each portion of the screw corresponding to the kneading sections (a) and (b) is preferably 10 to 60% and more preferably 20 to 55% of the overall length of the screw. If less than 10%, the shear force applied to the feedstocks is insufficient to result in a poor dispersion and/or distribution of the organized clay B. If more than 60%, the polyamides A1 and A2 are subject to increased heat history to be degraded, thereby causing the discoloration and the increase in the amount of gels and fish eyes. Further, the organizing agent in the organized clay B is degraded or decomposed by heat to cause the clay to agglomerate, thereby failing to attain a complete and fine dispersion and/or distribution of the clay and developing malodor attributable to the decomposed products of the organizing agent such as amines and ammonia. The portion of the screw corresponding to the kneading section (a) or (b) may be divided into two or more parts, as long as the length of the portion is within 10 to 60% of the overall length of the screw.

The melt kneading temperature in the kneading sections (a) and (b) is equal to or higher than the melting points of the polyamides A1, A2, and simultaneously, equal to or lower than the temperature where the organized clay B loses its weight by 10%, preferably by 8%, and more preferably by 5% when measure by thermogravimetry. If the melt kneading temperature is within the above range, the uniform fine dispersion and the uniform fine distribution of the organized clay B can be easily attained. The thermogravimetry is carried out according to the measuring method of JIS K-7120, for example, under nitrogen flow at a temperature rise rate of 10° C./min using a simultaneous thermogravimetric/differential thermal analyzer "DTG-50" available from Shimadzu Corporation. The actual resin temperature during the kneading tends to be higher than the temperature of the extruder because of the shearing heat generated by the rotation of screws. Therefore, it is recommended to measure the resin temperature as accurately as possible, for example, by measuring the resin temperature at the downstream end of the extruder. If exceeding the temperature where the organized clay B loses its weight by 10%, a large part of the organizing agent in the organized clay B is thermally degraded or decomposed to allow the clay to agglomerate, thereby failing to attain a complete fine dispersion and distribution of the clay, and developing malodor attributable to decomposed products of the organizing agent such as amines and ammonia. If less than the melting points of the polyamides A1, A2, the organized clay B is not finely dispersed and finely distributed because the polyamide is not melted.

In the melt kneading of the polyamide A1, A2 and the organized clay B for the production of the polyamide composite material of the present invention, the specific energy provided by the extruder to the feedstocks therein is preferably 0.2 to 0.45 kWh/kg on average between the feed port (a) and the downward end of the extruder. The specific energy referred to herein means the energy provided to a unit weight of feedstocks per unit time. If less than 0.2 kWh/kg, the energy is insufficient for kneading to fail to attain the fine dispersion and the fine distribution of the organized clay B. If larger than 0.45 kWh/kg, the polyamide A1, A2 receive an excessive energy to lower the viscosity of the polyamide, thereby likely to cause insufficient fine dispersion and fine distribution of the organized clay B. In addition, the polyamide is degraded and damaged. As a result, YI is increased, the amount of gels or fish eyes is increased and the drawdown is likely to occur in the process for forming films and sheets because of the lowered molecular weight and melt viscosity, thereby reducing the commercial values of the resultant composite material and its shaped articles.

The overall residence time for melt-kneading the polyamide A1, A2 and the organized clay B in the twin-screw extruder is preferably 60 to 1200 s, more preferably 80 to 1000 s, and still more preferably 100 to 800 s. The overall residence time referred to herein means the time required for kneading, and more specifically the time taken from the feed of the polyamide A1 and the organized clay B through the feed portion (a) until the feedstocks are extruded from the die. The overall residence time may be determined, for example, by measuring the time from feeding a colored pellet, etc. through the feed portion (a) until the color of the strand being extruded from the die is changed. If shorter than 60 s, insufficient fine dispersion and fine distribution of the organized clay B are likely to be caused. If longer than 1200 s, the polyamides A1 and A2 are subject to increased heat history to be degraded, thereby causing the discoloration and the increase in the amount of gels and fish eyes. Further, the organizing agent in the organized clay B is degraded or decomposed by heat to cause the clay to agglomerate, thereby failing to attain a complete and fine dispersion and distribution of the clay and developing malodor attributable to the decomposed products of the organizing agent such as amines and ammonia.

The residence time of the polyamide A2 from being fed through the feed port (b) until being extruded from the die of the extruder is preferably 10 to 600 s, more preferably 15 to 400 s, and still more preferably 20 to 300 s.

In the present invention, the polyamide A1, the polyamide A2 and the organized clay B are preferably fed into the twin-screw extruder and melt-kneaded therein so as to satisfy the following conditions (1) and (2):

(1) X/Y is preferably 1 to 8, more preferably 1.5 to 6 and still more preferably 2 to 4, and (2) 100Y/(X+Y+Z) is preferably 1 to 20, more preferably 1.2 to 18 and still more preferably 1.5 to 16, wherein X is the weight (kg) of the polyamide A1 fed through the feed port (a), Y is the weight (kg) of the organized clay B fed through the feed port (a), and Z is the weight (kg) of the polyamide A2 fed through the feed port (b).

If X/Y exceeds 8, the amount of the polyamide A1 to be degraded and damaged by the heat generation increases to increase YI, increase the amount of gels and fish eyes and cause the drawdown in the process for forming films and sheets because of the lowered molecular weight and melt viscosity, thereby reducing the commercial values of the resultant composite material and its shaped articles. When X/Y is less than 1, the amount of the organizing agent to be degraded and damaged by heat increases to cause the agglomeration of the organized clay B, thereby failing to attain a complete and fine dispersion and/or distribution of the clay in the polyamide composite material and also developing malodor attributable to the decomposed products of the organizing agent such as amines and ammonia If 100Y/(X+Y+Z) is less than 1, the effect of improving the gas barrier properties is insufficient. If exceeding 10, it becomes difficult to uniformly disperse or distribute the organized clay B throughout the polyamides A1 and A2.

The number-average molecular weight of the overall polyamide (polyamide A1+polyamide A2) is 10,000 to 50,000. The number-average molecular weight may be appropriately selected according to applications of the polyamide composite material and molding methods. For example, when the polyamide composite material is required to have a fluidity of certain degree in the film-forming process, the number-average molecular weight is about 20,000 to 30,000, and when the polyamide composite material is required to have a melt strength in the sheet-forming process, the number-average molecular weight is about 30,000 to 45,000, although not limited thereto.

The polyamide composite material of the present invention has a water content of less than 0.2% by weight in view of a good moldability. If the water content is 2% by weight or higher, the reduction of molecular weight, the formation of gelled mass and bubbles and the drawdown are likely to occur. Therefore, the polyamide composite material is preferably dried before use to reduce the water content. The drying of the polyamide composite material may be conducted by known methods, for example, a method of removing water from the polyamide composite material by evacuating the interior of a cylinder by a vacuum pump during the melt extrusion of the polyamide composite material from a vented extruder; and a method of drying the polyamide composite material by heating in a tumbler (rotary vacuum vessel) at a temperature not higher than the melting points of the polyamide A1 and A2 under reduced pressure, although not limited thereto.

The polyamide composite material of the present invention may contain another resin such as nylon 6, nylon 66, nylon 6,66, polyesters and polyolefins unless the effects of the present invention are adversely affected. The polyamide composite material may further contain various additives, for example, inorganic fillers such as glass fibers and carbon fibers; plate-like inorganic fillers such as glass flakes, talc, kaolin and mica; impact modifiers such as various elastomers; nucleating agents; lubricants such as fatty acid amides and fatty acid metal salts; antioxidants such as copper compounds, organic or inorganic halogen compounds, hindered phenols, hindered amines, hydrazine compounds, sulfur compounds and phosphorus compounds; heat stabilizers; discoloration inhibitors; ultraviolet light absorbers such as benzotriazole compounds; mold release agents; plasticizers; colorants; flame retardants; oxygen-capturing agents such as cobalt-containing compounds; and inhibitors such as alkali compounds for preventing the gelation of the polyamides A1 and A2.

The polyamide composite material of the present invention is excellent in gas barrier properties and transparency, and shows a stable melting properties. The polyamide composite material may be formed into single-layer films or sheets using, for example, T-die extruders or blown film extruders, and further may be formed into packaging materials such as multi-layer films and sheets by laminating a layer made of polyethylene, polypropylene, nylon 6, PET, metal foil, paper, etc., by an extrusion laminating method or a co-extrusion method. In addition, the polyamide composite material may be applied to wrapping materials and packaging containers having various shapes such as pouches, lids, bottles, cups, trays and tubes. The packaging containers made of the polyamide composite material of the present invention exhibit excellent gas barrier properties and transparency and are useful to preserve various products. Examples of the products to be preserved include liquid beverages such as carbonated beverage, juice, water, milk, sake, whisky, shochu, coffee, tea, jelly beverage and healthy beverage; seasonings such as liquid seasoning, sauce, soy sauce, dressing, liquid soup stock, mayonnaise, miso and grated spices; pasty foodstuffs such as jam, cream and chocolate paste; liquid foodstuffs represented by liquid processed foodstuffs such as liquid soup, boiled food, pickles and stew; raw or boiled noodles such as buckwheat noodle, wheat noodle and Chinese noodle; uncooked or boiled rice such as polished rice, water-conditioned rice and washing-free rice; processed rice products such as boiled rice mixed with fish and vegetables, rice boiled together with red beans and rice gruel; high water content foodstuffs represented by powdery seasonings such as powdery soup and powdery soup stock; low water content foodstuffs such as dehydrated vegetables, coffee beans, coffee powder, leaf tea and confectioneries made of cereals; solid and liquid chemicals such as agricultural chemicals and insecticides; and liquid or past products such as drugs, beauty wash, cosmetic cream, milky lotion, hair dressing, hair dye, shampoo, soap and detergent.

The present invention will be described in more detail below with reference to the following examples. In the following examples, the polyamide composite materials were evaluated by the following methods.

(1) Relative Viscosity $\eta_r$

One gram of polyamide was accurately weighed and dissolved in 100 cc of 96% sulfuric acid at 20 to 30° C. under stirring. After complete dissolution, 5 cc of the resulting solution was immediately placed in a Canon Fenske viscometer. After the viscometer was allowed to stand in a thermostatic chamber maintained at 25±0.03° C. for 10 min, a dropping time (t) was measured. Also, a dropping time ($t_0$) of the 96% sulfuric acid itself was measured. The relative viscosity $\eta_r$ of the polyamide was calculated from the measured t and $t_0$ according to the following formula:

$$\text{Relative Viscosity } \eta_r = (t)/(t_0).$$

(2) Water Content

Measured at 235° C. for 50 min in a nitrogen atmosphere by using a trace water analyzer "CA-05" available from Mitsubishi Chemical Corp.

(3) Haze

Measured on a film according to ASTM D1003 using a color difference-turbidity meter "COH-300A" available from Nippon Denshoku Kogyo Co., Ltd.

(4) Oxygen Permeability

Measured on a film at 23° C. and a relative humidity of 60% according to ASTM D3985 using "OX-TRAN 10/50A" available from Modern Controls Co., Ltd.

(5) X-Ray Diffraction (XRD)

Performed using an analyzer "MINIFLEX" available from Rigakusha Co., Ltd. under conditions of: CuKα X-ray source, 4.2° of scattering slit, 0.3 mm of light-receiving slit, 30 kV of lamp voltage, 15 mA of lamp current, 2 to 50° of scanning range, 0.02° of sampling width, and 5°/min of scanning speed.

(6) YI

Measured on pellets by a transmission method according to ASTM D1003 using "Z-Σ80 Color Measuring System" available from Nippon Denshoku Kogyo Co., Ltd.

The organized clay used in the examples and comparative examples was "NEW D ORBEN" available from Shiraishi Kogyo Co., Ltd., which was prepared by organizing montmorillonite with dimethyldioctadecylammonium salt.

EXAMPLE 1 m-Xylylenediamine was polycondensed with adipic acid in a molten state for a predetermined period of time and extruded from a nozzle at the bottom of the polymerization vessel into a form of strand, which was cut into pellets after air cooling to obtain two types of poly(m-xylylene adipamide) (PA1 and PA2). PA1 had a relative viscosity $\eta_r$ of 2.56 and a phosphorus atom concentration of 150 ppm, and PA2 had a relative viscosity $\eta_r$ of 2.63. Through the feed port (a), PA1 was fed using a belt feeder at a rate of 6.12 kg/h, and the organized clay was fed using a screw feeder at a rate of 2.04 kg/h, while side-feeding PA2 through the feed port (b) using a vibration feeder at a rate of 51.84 kg/h. The feedstocks were melt-kneaded in a vented corotating intermeshing twin-screw extruder equipped with the screws as shown in FIG. 2, and dried at 140° C. for 5 h to produce 100 kg of a polyamide composite material (C1). C1 had a relative viscosity $\eta_r$ of 2.50 and YI of 44.6, and was free from amine and ammonia odor attributable to the decomposition of the organizing agent. The pellets were fed to a single-screw extruder having a cylinder diameter of 20 mm at a feed rate of 1.2 kg/h, and extruded through a T-die into a form of film, which was solidified on a roll to produce a film having a thickness of 80 µm. The film was extremely excellent in gas barrier properties and transparency as was evidenced by having a good appearance, a haze of 1.3%, and an oxygen permeability of 0.01 cc·mm/m²·day·atm. XRD showed no remarkable peak attributable to the clay.

EXAMPLE 2 m-Xylylenediamine was polycondensed with adipic acid in a molten state for a predetermined period of time and extruded from a nozzle at the bottom of the polymerization vessel into a form of strand, which was cut into pellets after air cooling to obtain two types of poly(m-xylylene adipamide) (PA3 and PA4). PA3 had a relative viscosity $\eta_r$ of 2.45 and a phosphorus atom concentration of 150 ppm, and PA4 had a relative viscosity $\eta_r$ of 2.68. Through the feed port (a), PA3 was fed using a belt feeder at a rate of 6.12 kg/h, and the organized clay was fed using a screw feeder at a rate of 2.04 kg/h, while side-feeding PA4 through the feed port (b) using a vibration feeder at a rate of 51.84 kg/h. The feedstocks were melt-kneaded in a vented corotating intermeshing twin-screw extruder equipped with the screws as shown in FIG. 2, and dried at 140° C. for 5 h to produce 100 kg of a polyamide composite material (C2). C2 had a relative viscosity $\eta_r$ of 2.60 and YI of 44.0, and was free from amine and ammonia odor attributable to the decomposition of the organizing agent. The pellets were fed to a single-screw extruder having a cylinder diameter of 20 mm at a feed rate of 1.2 kg/h, and extruded through a T-die into a form of film, which was solidified on a roll to produce a film having a thickness of 80 µm. The film was extremely excellent in gas barrier properties and transparency as was evidenced by having a good appearance, a haze of 2.0%, and an oxygen permeability of 0.02 cc·mm/m²·day·atm. XRD showed no remarkable peak attributable to the clay.

As seen from Examples 1 and 2, in the polyamide composite materials produced by the method of the present invention, the organized clay was well dispersed and distributed throughout the polyamides, YI was low, and the organizing agent and polyamides were little degraded. The polyamide composite materials provided films with high-quality having extremely excellent gas barrier properties and transparency.

In general, a poor dispersion and distribution of clay results in increased hazes and insufficient gas barrier properties of molded articles because of the presence of agglomerates of clay and voids around the agglomerates. In contrast, in the polyamide composite materials produced by the process of the present invention, the dispersion and distribution of the clay is especially excellent. Therefore, in the films, etc., produced therefrom, the haze is lowered to provide an excellent transparency, and the gas barrier properties are improved to significantly reduce the oxygen permeability.

Thus, the polyamide composite material and the production process according to the present invention are excellent in the dispersion and distribution of the organized clay as compared to those conventionally known. Therefore, the polyamide composite material is excellent in gas barrier properties and transparency, and additionally, is subject to little degradation of polyamides and generates little malodor, resulting in high commercial value and excellent industrial value as compared to conventional materials.

What is claimed is:

1. A process for producing a polyamide composite material comprising a polyamide A1, a polyamide A2, each being produced by polycondensing a diamine component containing 70 mol % or higher of m-xylylenediamine with a dicarboxylic acid component containing 50 mol % or higher of a $C_4$ to $C_{20}$ d,w-linear aliphatic dicarboxylic acid, and an organized clay B, by using a corotating intermeshing twin-screw extruder in which at least a feed section (a) with a feed port (a), a kneading section (a) having a high dispersive mixing capability, a feed section (b) with a feed port (b) and a kneading section (b) having a high distributive mixing capability are arranged in this order, the process comprising:
    a step of feeding the polyamide A1 containing a phosphorus compound in an amount of 500 ppm or smaller in terms of phosphorus atom and having a relative viscosity of 1.1 to 4.7 and the organized clay B into the feed section (a) through the feed port (a);
    a step of melt-kneading the polyamide A1 and the organized clay B substantially by dispersive mixing in the kneading section (a) to obtain a melt-knead product;
    a step of transporting the melt-knead product from the kneading section (a) to the feed section (b), and simultaneously feeding the polyamide A2 having a relative viscosity of 2.0 to 4.7 into the feed section (b) through the feed port (b), wherein the relative viscosity of the polyamide A1 is less than the relative viscosity of the polyamide A2; and
    a step of melt-kneading the melt-knead product and the polyamide A2 each from the feed section (b) substantially by distributive mixing in the kneading section (b) to prepare the polyamide composite material.

2. The process according to claim 1, comprising:
    a step of transporting the polyamide A1 and the organized clay B towards a downstream end of the corotating intermeshing twin-screw extruder by a transport portion (a) of a screw provided to the extruder;
    a step of melt-kneading the polyamide A1 and the clay B each from the feed section (a) by a portion of the screw comprising a group of elements having a high dispersive mixing capability to obtain the melt-knead product (a);
    a step of transporting the melt-knead product (a) from the kneading section (a) and the polyamide A2 from the feed port (b) towards the downstream end of the extruder by a transport portion (b) of the screw;

a step of melt-kneading the melt-knead product (a) and the polyamide A2 each from the feed section (b) by a portion of the screw comprising a group of elements having a high distributive mixing capability to obtain a melt-knead product (b); and a step of transporting the melt-knead product (b) towards the downstream end of the extruder by a transport portion (c) of the screw.

3. The process according to claim 1, wherein the polyamide A1 and the organized clay B are melt-kneaded in the kneading section (a) by a screw having a high dispersive mixing capability which comprises at least one element having a pressure-dropping function to allow the kneading section (a) to be filled with the polyamide A1 and the organized clay B, and at least one element selected from the group consisting of a kneading disk having a broad disk width and a rotor.

4. The process according to claim 1, wherein the melt-knead product from the kneading section (a) and the polyamide A2 fed through the feed port (b) are melt-kneaded in the kneading section (b) by a screw having a high distributive mixing capability which comprises at least one element having a pressure-dropping function to allow the kneading section (b) to be filled with the melt-knead product and the polyamide A2, and at least one element selected from the group consisting of a kneading disk having a narrow disk width, a rotor, a notched flight disk and a mixing gear.

5. The process according to claim 3, wherein the element having the pressure-dropping function is an reverse full-flight disk and/or a sealing disk.

6. The process according to claim 4, wherein the element having the pressure-dropping function is an reverse full-flight disk and/or a sealing disk.

7. The process according to claim 3, wherein at least a part of the kneading section (a) is provided with a kneading disk having a ratio W/D of 0.15 or higher wherein W is a width of the kneading disk and D is a screw diameter of the twin-screw extruder.

8. The process according to claim 4, wherein at least a part of the kneading section (a) is provided with a kneading disk having a ratio W/D of 0.15 or higher wherein W is a width of the kneading disk and D is a screw diameter of the twin-screw extruder.

9. The process according to claim 2, wherein a length of the screw in each of the kneading sections (a) and (b) is 10 to 60% of an overall length of the screw.

10. The process according to claim 1, wherein a melt-kneading temperature in the kneading sections (a) and (b) is equal to or higher than melting points of the polyamides A1 and A2, and simultaneously, equal to or lower than a temperature where the organized clay B loses its weight by 10% when measured by thermogravimetry according to JIS K-7120.

11. The process according to claim 1, wherein a specific energy provided by the corotating intermeshing twin-screw extruder to the polyamides A1 and A2 and the organized clay B is 0.2 to 0.45 kWh/kg on average between the feed port (a) and the downward end of the extruder.

12. The process according to claim 1, wherein the kneading is performed so that an overall residence time in the corotating intermeshing twin-screw extruder is 60 to 1200 s.

13. The process according to claim 1, satisfying the following requirements:

$$1 \leq X/Y \leq 8, \text{ and}$$

$$1 \leq 100Y/(X+Y+Z) \leq 20$$

wherein X is a weight (kg) of the polyamide A1 fed through the feed port (a); Y is a weight (kg) of the organized clay fed through the feed port (a); and Z is a weight (kg) of the polyamide A2 fed through the feed port (b).

* * * * *